United States Patent [19]

Vermot-Gaud et al.

[11] Patent Number: 4,575,737

[45] Date of Patent: Mar. 11, 1986

[54] DEVICE FOR PROJECTING DROPLETS OF AN ELECTRICALLY CONDUCTING LIQUID

[75] Inventors: Jacques Vermot-Gaud, Perly; Pierre Genequand, Petit Saconnex, both of Switzerland

[73] Assignee: Battelle Memorial Institute, Carouge/Geneve, Switzerland

[21] Appl. No.: 619,557

[22] PCT Filed: Oct. 5, 1983

[86] PCT No.: PCT/CH83/00110

§ 371 Date: Jun. 7, 1984

§ 102(e) Date: Jun. 7, 1984

[87] PCT Pub. No.: WO84/01544

PCT Pub. Date: Apr. 26, 1984

[30] Foreign Application Priority Data

Oct. 8, 1982 [CH] Switzerland ........................ 5914/82

[51] Int. Cl.$^4$ ........................................ G01D 15/16

[52] U.S. Cl. ........................................ 346/140 R

[58] Field of Search ........................ 346/140 PD

[56] References Cited

U.S. PATENT DOCUMENTS 3,834,301 9/1974 Croquelois et al. .................... 101/1

4,275,290 6/1981 Cielo et al. .

4,383,265 5/1983 Kohashi ........................ 346/140 PD

FOREIGN PATENT DOCUMENTS 1484368 9/1977 United Kingdom ......... 346/140 PD 2031344 10/1979 United Kingdom .

*Primary Examiner*—E. A. Goldberg

*Assistant Examiner*—Fred L. Kampe

*Attorney, Agent, or Firm*—Karl F. Ross; Herbert Dubno

[57] ABSTRACT

This device comprises an electrode, the diameter of which is of the same order of magnitude as the drop to be projected, which emerges on the surface of an electrically insulating support. This support is immersed in a reservoir of liquid which comprises an opening. The support is placed so that the face thereof with which the electrode is flush, is located at a certain distance recessed from the plane of the opening so that it is covered with the liquid contained in the reservoir in which is located the counter-electrode. These electrodes are connected to a source of intermittent current designed to form an electric field through the liquid which, by concentrating on that part of the electrode emerging from the support, causes the projection of a drop of liquid.

5 Claims, 8 Drawing Figures

DEVICE FOR PROJECTING DROPLETS OF AN ELECTRICALLY CONDUCTING LIQUID

CROSS REFERENCE TO RELATED APPLICATIONS

This application is a National Phase Application corresponding to the PCT/CH83/00110 filed Oct. 5, 1983 and based, in turn, upon Swiss National Application No. 5914/82-83 filed Oct. 8, 1982, the priority of which has been claimed under the International Convention.

FIELD OF THE INVENTION

This invention relates to a device for projecting droplets of an electrically conducting liquid.

BACKGROUND OF THE INVENTION

There are two types of devices for projecting droplets of a liquid, in particular, ink in ink-jet printing systems. One of these types consists in fractionates a pressurized jet into droplets and requires a source of liquid under pressure, a nozzle designed to form a jet, means which can induce high frequency pressure variations in the flow in order to fractionate it, means for directing the droplets and means for recovering and recycling the unused ink. These devices are designed preferably for large plants because they use relatively numerous and complex means and because of the substantial throughput of ink. They are designed for machines such as large computers or very high frequency text processing printers, the cost of which is in line with this type of ink jet device.

The other of these types makes it possible to project droplets at will and generally comprises means for creating an overpressure within an enclosure containing the liquid to be projected and having an opening through which the liquid is expelled whenever the pressure exceeds the force of cohesion of the meniscus formed by the liquid in that opening. Such a device is described, in particular, in U.S. Pat. No. 3,832,579.

This device has a frequency or period of droplet formation which is limited by the speed at which the meniscus can form again after the expulsion of a drop, said period of formation being of the order of $100\times10^{-6}$s.

All known ink jet devices use an orifice connected to a reservoir in order to project the droplets. Such devices require droplet tubes in the case of a printer permitting the simultaneous formation of a multiplicity of droplets. A matrix of tubes which can produce this simultaneous projection raises obvious practical problems. In addition, the nozzles through which the ink is projected may clog up, in particular, after a period of nonuse.

OBJECT OF THE INVENTION

The object of this invention is to eliminate, at least partially, the above-mentioned drawbacks.

SUMMARY OF THE INVENTION

To this effect, this invention provides a device for projecting drops of an electrically conducting liquid, characterized by the fact that it comprises at least one electrode the diameter of which is of the same order of magnitude as that of the drops to be projected, flush with a surface of an electrically insulating support, a source of intermittent current one pole of which is connected to that electrode, means for forming a layer of said liquid having a specified thickness, covering at least the surface of the support at which the electrode is flush and a second electrode in contact with said layer and connected to the other pole of the source of intermittent current so as to form an electric field through said liquid, concentrating on that part of the electrode flush with the surface of said support.

The advantages of the device, which is the object of the invention, are numerous. The droplets are no longer projected through a hole but are detached from the surface of a layer of liquid. As a result, the speed of reformation of the layer is less critical. The formation of a matrix for the simultaneous projection of droplets can be obtained, for example, by means of a printed circuit technique, the distance between the droplet generating electrodes being reduced with respect to a matrix of tubes. It is possible to implement the invention in the form of a very planar structure. Transducers are no longer necessary to create the force necessary to project the droplets. The cost of production of such a device is substantially reduced. As a result, the possible applications are extremely numerous to the extent that this cost is even lower than that of existing devices with a lesser performance. The use of such a device can thus be contemplated in printers for table calculators, for the marking of dates and hours on transportation documents, for the marking of dates on wrappings for perishable goods, to mention but a few possible applications among others.

BRIEF DESCRIPTION OF THE DRAWING

The appended drawing illustrates, diagrammatically and by way of example, different embodiments of the device according to this invention.

SPECIFIC DESCRIPTION

Figure 1:
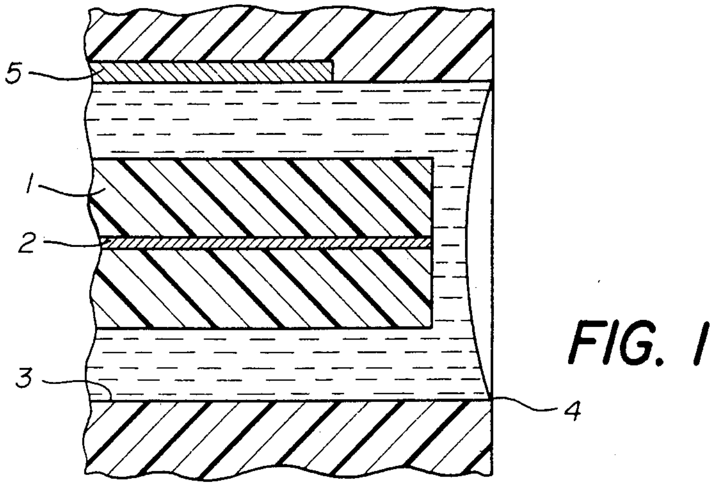
FIG. 1 is a sectional view of an embodiment of the device according to the invention.
Figure 2A:
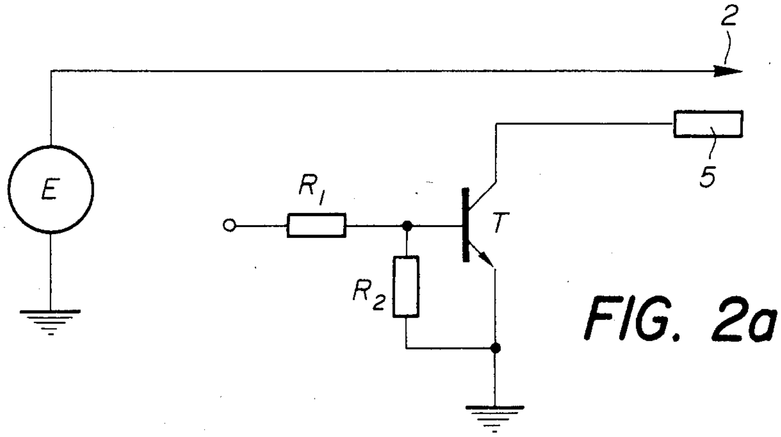
FIGS. 2*a* and 2*b* illustrate power supply circuit diagrams forthe device.
Figure 2B:
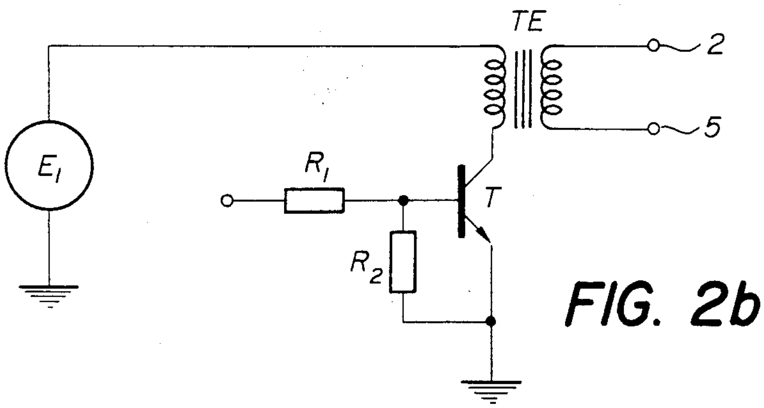

The device illustrated in FIG. 1 comprises a support 1 shaped as a cylindrical block made of an insulating material through which passes axially a metal wire 2 made of a metal which is a good conductor of electric current, connected to one of the poles of a source of electric pulses illustrated in FIGS. 2*a* or 2*b*. This cylindrical block 1 is located in a reservoir 3 containing ink, the reservoir being made of an electrically insulating material, having an opening 4 in which the ink contained in said reservoir 3 is retained by the force of cohesion of its meniscus. A counter-electrode 5 is located somewhere in reservoir 3 at a distance from electrode 2 and is connected at the other pole of the source of electric pulses.

This pulse source can be a high voltage source E as illustrated in FIG. 2*a* with an output level ranging, for example, from 500 to 1500 volts, connected to electrode 2. Counter-electrode 5 is connected to the collector of a high voltage transistor T the base of which is connected to a low voltage pulse source (not shown) with pulses of 5 μs and 5 volts, for example, through a resistance $R_1$, a resistance $R_2$ being connected between the base of transistor T and the transmitter thereof. The other circuit illustrated in FIG. 2*b* differs from the circuit of FIG. 1 in that the voltage source $E_1$ is a low voltage source ranging, for example, from 5 to 15 volts, a step-up transformer TE being then located between this source and electrodes 2 and 5. The rest of the circuit is identical to that of FIG. 2*a*, but employs a low voltage transistor.

According to a practical embodiment of the invention, the metal wire 2 acting as an electrode consists of a platinum wire having a diameter of 20 μm located in a 0.5 mm diameter insulating cylindrical block, the diameter of opening 4 in reservoir 3 being 0.8 mm and the depth of the end face of insulating block 1 behind the opening 4 being approximately 0.2 mm.

The tests were carried out using electrically conducting inks of various types manufactured by IBM, Varian as well as inks developed by ourselves.

The physical process leading to the projection of droplets has not been completely explained; nevertheless, it is probable that the ejection process is due to the production of free charges in the ink when an electric field is set up near electrode 2. As is known, the appearance of free charges in an electrolyte follows the appearance of a resistivity gradient. Now, since there is a high field concentration near electrode 2 which can be viewed as a tip, the concentration of current causes the ink to heat up near that tip. As a result, there is a decrease in resistivity, as for any electrolyte whose temperature increases between that portion of liquid ink adjacent to electrode 2 and the rest of the ink mass. An annular electrostatic force is exerted on the surface of the liquid at right angles to the edge of electrode 2 and induces the ejection of a drop.

The tests carried out using the above-mentioned device have shown that the thickness of the layer of liquid covering the electrode plays a relatively important role to the extent that, with a very thin layer of the order of several dozen μm, atomization of the liquid is obtained whereas with a layer of the order of several dozen mm, very few stray drops are obtained. The voltage applied between electrodes 2 and 5 as well as the pulse duration have an effect on drop size. It has been noted that the necessary voltages can range from approximately 500 to 4000 volts, the trials having been carried out essentially using a power supply ranging from 500 to 1500 volts. The duration of the pulses applied was chosen to be 5 μs.

Figure 7:
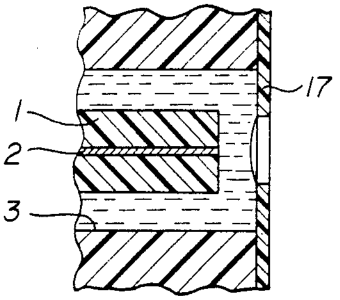
FIG. 7 is a sectional view of an embodiment which is a variant of FIG. 1.

The varying embodiment illustrated in FIG. 7 shows a device which in all respects is similar to that of FIG. 1 in front of the opening of which is located a mask 17 having a central opening located opposite electrode 2 but the diameter of which is substantially greater than that of the latter electrode and therefore also greater than the size of the drops. This mask is designed to avoid an interaction between the meniscus and the surrounding air, in particular, at high operating frequencies. Indeed, this interaction results in the production of stray drops and in the incorporation of bubbles on the surface of the liquid.

The diameters of cylindrical block 1 and of opening 4 do not have any direct effect on the process of formation of the drops. The size of opening 4 is important only when an ink reservoir 3 is used with an opening 4 located in a vertical plane since, in such a case, the diameter of opening 4 must allow the ink to form a stable meniscus capable of resisting the static pressure exerted by the liquid contained in reservoir 3.

Since the dimensions of cylindrical block 1 and of opening 4 do not have any effect on the process of formation of the drops, it is possible, therefore, to imagine structures other than those shown in FIG. 1.

Figure 3:
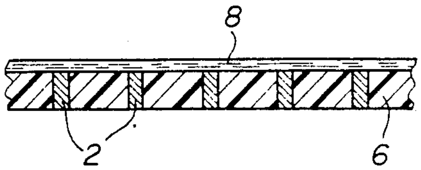
FIG. 3 is a sectional view of another embodiment.
Figure 4:
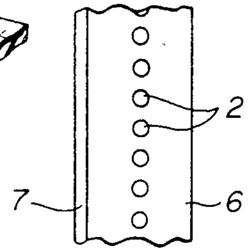
FIG. 4 is a top view of FIG. 3.

Thus, as illustrated in FIGS. 3 and 4, it is possible to form an insulating ribbon 6 in which electrodes 2 are located. The edge of ribbon 6 has a conducting track 7. This ribbon can be inked by an inking roller (not shown) so as to form an ink film 8 on the surface thereof, this film covering a face of insulating ribbon 6 which is in contact with electrodes 2 and conducting track 7 so that an electric field can be set up through ink film 8 under the same conditions as in the case of FIG. 1. It is then possible to form a ribbon 6, of the endless type, designed to pass through opposite the printing zone and to regenerate the ink film porgressively, electrodes 2 being connected selectively to the source of current. It is of course possible, in such a case, to provide several rows of parallel electrodes 2.

Figure 5:
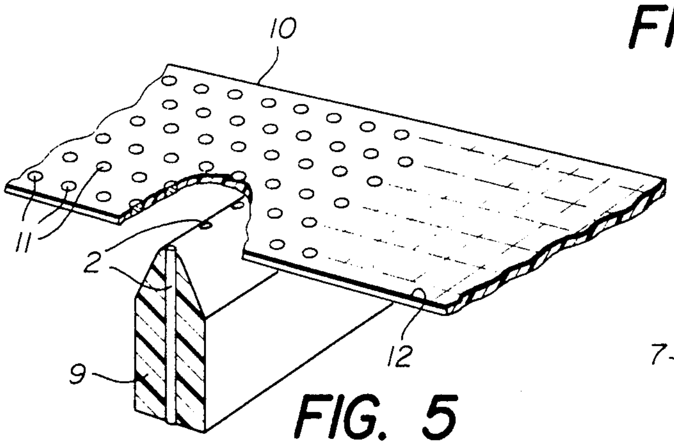
FIG. 5 is a perspective view, broken away, of a third embodiment.

As a varying embodiment, as shown in FIG. 5, the insulating support can be made of a fixed block 9 on one face of which electrodes 2 are flush. The ink is retained on a ribbon 10 which can be made, for example, of a plastic material provided with perforations 11 filled with ink by means of an inking roller (not shown) applied against the lower face of ribbon 10 and the upper face of which has a metallized layer 12 and is designed to form the counter-electrode.

The metallized layer 12 can of course comprise different parallel conducting tracks extending longitudinally on the surface of ribbon 10.

The fact that ink is no longer delivered through a nozzle therefore has substantial advantages, in particular, in a device for the simultaneous projection of several drops. Indeed, the presence of holes generally requires tubular structures separated from one another. The elimination of these holes makes it possible to bring electrodes 2 closer together so as to increase the density of the drops per unit surface. Under these conditions and by using an addressing system in order to supply electrodes 2, it is possible to imagine the setting up of electrode matrices as well as their selective excitation. It is then possible not only to form characters but also images and, for example, to transmit images and diagrams over a distance.

Figure 6:
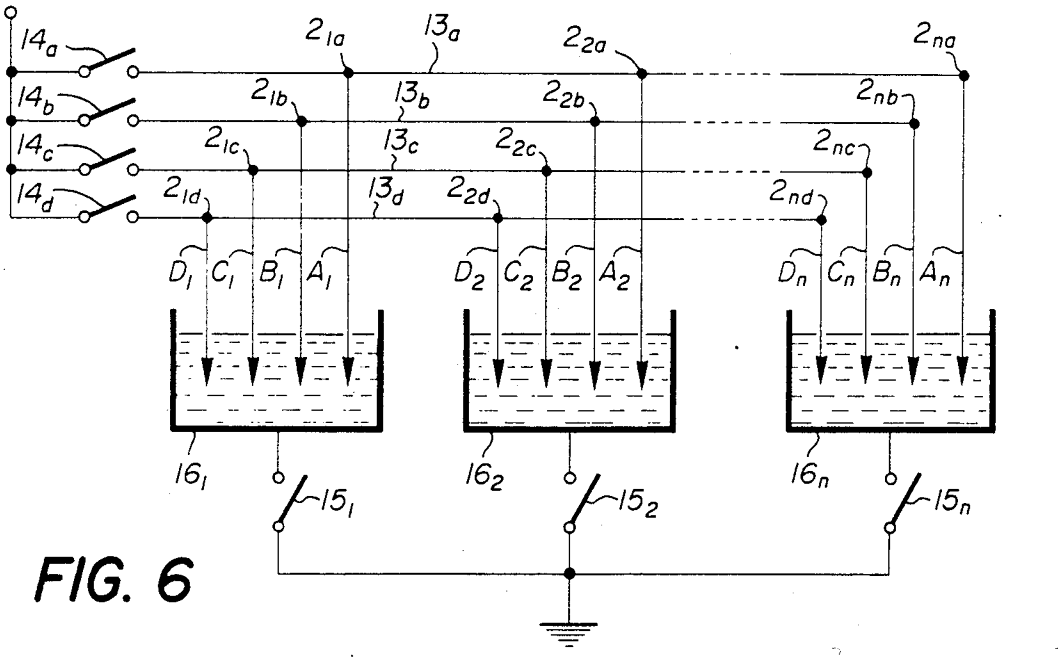
FIG. 6 is an addresssing circuit diagram of a multiplicity of electrodes.

An addressing circuit for electrodes 2 can, for example, be provided as illustrated in the diagram of FIG. 6. This diagram shows the electrodes grouped in n series to form electrodes $2_{1a}$, $2_{1b}$, $2_{1c}$, $2_{1d}$ for the first series, $2_{2a}$, $2_{2b}$, $2_{2c}$, $2_{2d}$ for the second series and $2_{na}$, $2_{nb}$, $2_{nc}$ and $2_{nd}$ for the nth. series. Each electrode of a given series is located at the junction of two conductors $13_a$, $13_b$, $13_c$, $13_d$ on the hand and $A_1$, $B_1$, $C_1$ and $D_1$ for the first series, $A_2$, $B_2$, $C_2$, $D_2$ for the second series and $A_n$, $B_n$, $C_n$ and $D_n$ for nth. series. Therefore, electrodes $2_{1a}$, $2_{2a}$, $2_{na}$ are connected to one and the same switch $14_a$, electrodes $2_{1b}$, $2_{2b}$, $2_{nb}$ are connected to one and the same switch $14_b$, electrodes $2_{1c}$, $2_{2c}$, $2_{nc}$ are connected to switch $14_c$ and electrodes $2_{1d}$, $2_{2d}$, $2_{nc}$ are connected to switch $14_d$. Electrodes $2_1$, $2_2$, $2_n$ of a given series are connected to one and the same switch $15_1$ respectively $15_2$ and $15_n$ through the conducting ink contained in n reservoirs $16_1$ respectively $16_2$, $16_n$. With regard to FIG. 5, reservoirs $16_1$ to $16_n$ could of course correspond to the conducting tracks 12 formed on the surface of ribbon 10.

The addressing of each electrode is obtained by first closing switch $15_1$ and those from among switches $14_a$ to $14_d$ corresponding to the electrodes to which voltage is to be applied.

The distance between the electrodes must be at least 100 μm in order to avoid extraneous interactions between the electrodes. At this distance between active and inactive electrodes, the potential of the latter is very much lower than the threshold of activity. Multiplexing with time of the reservoir or electrodes is easy since the duration of the pulses is of the order of 2 to 5 μs with a maximum frequency of $10^4$ Hz.

Such an addressing circuit can be used both for an electrode matrix and for a line of electrodes similar to the one shown, for example, in FIG. 5.

As can be noted, the device according to the invention offers very substantial advantages in comparison with most existing devices. These advantages are essentially derived from the fact that the drop is projected from a layer of liquid which no longer requires nozzles and that it is possible to obtain plane structures. For a given liquid, besides the thickness of the layer of liquid, all the parameters influencing the formation of drops are electric parameters. In addition, the electric current acts directly on the liquid without the intervention of a transducer. No stray resistance comes to take up a position in series within the power supply circuit and the entire electric resistance is concentrated in the high field gradient useful zone.

It should also be noted that the fact that the meniscus is formed again is independent of the diameter of a nozzle and depends only on the rheological properties of the liquid. As a result, it may be estimated that the maximum frequency of formation of the drops can be increased with respect to an ink jet device, at will, using a nozzle.

The energy consumed by the device according to the invention is very little. Consider, for example, a resistance of electrode 2 and of the ink associated with it of 10 000 ohms and a supply voltage of 1 000 volts; the instantaneous current is:

$$I = \frac{1\ 000 \text{ volts}}{100\ 000 \text{ ohms}} = 10 \text{ mA}$$

and the instantaneous power is:

$$P = \frac{(1000)^2 \text{V}}{1000\ 000 \text{ ohms}} = 10 \text{ watts}$$

The energy consumed during a pulse of 5 $\mu s = 5 \times 10^{-5}$ joules. This energy can be further reduced to the extent that pulse duration can be brought down to ≃2 μs.

I claim:

1. A nozzle-less device for the projection of drops of an electrically conducting liquid onto a substrate, said device comprising:

an electrically insulating support;

at least one first electrode in said support having a surface flush with the surface of said support and of a diameter of the same order of magnitude as the diameter of drops to be projected from said device;

means for applying said liquid as a layer over said surfaces in a thickness such that drops are generated solely by electrical activation of the device; and a source of intermittent current having a pole connected to said first electrode and another pole connected to a second electrode in contact with said liquid layer for electrically activating said device exclusively between said electrodes whereby the electrical field created to generate droplets at said surface of said first electrode is concentrated at its surface and extends between said first electrode and said second electrode.

2. The device defined in claim 1 wherein said support comprises a ribbon.

3. The device defined in claim 1 wherein said means for applying said liquid comprises an insulating ribbon having a face adapted to contact said support and an opposite face which is metallized to form said second electrode.

4. The device defined in claim 1, further comprising a reservoir of said liquid having an opening through a lateral wall thereof dimensioned such that the liquid forms a meniscus equilibrating static pressure of a head of said liquid in said reservoir to form said layer, said support comprising a cylindrical block extending toward said opening but recessed from an edge thereof by a distance substantially equal to a desired liquid layer thickness, said first electrode extending substantially axially through said block.

5. The device defined in claim 1 wherein a plurality of such first electrodes are arrayed along said support with their respective surfaces flush with said surface of said support.

* * * * *